Dec. 17, 1963 J. AVINS 3,114,889

DESIRED FREQUENCY COUPLING CIRCUIT HAVING UNDESIRED FREQUENCY CANCELLATION TRAP LOCATED AT VOLTAGE NULL POINT FOR DESIRED FREQUENCY

Filed Sept. 14, 1954 2 Sheets-Sheet 1

INVENTOR.
JACK AVINS
BY
[signature]
ATTORNEY

INVENTOR.
JACK AVINS
BY
[signature]
ATTORNEY 3,114,889

DESIRED FREQUENCY COUPLING CIRCUIT HAVING UNDESIRED FREQUENCY CANCELLATION TRAP LOCATED AT VOLTAGE NULL POINT FOR DESIRED FREQUENCY

Jack Avins, New York, N.Y., assignor to Radio Corporation of America, a corporation of Delaware Filed Sept. 14, 1954, Ser. No. 455,826
12 Claims. (Cl. 333—76)

This invention relates generally to signal transfer apparatus, and more particularly to novel coupling networks comprising bandpass networks and trap or rejection circuits, and to intermediate frequency amplifiers for monochrome and color television receivers utilizing such coupling networks.

In intermediate frequency amplifiers for monochrome television receivers, it is conventional to provide trap circuits adapted to attenuate the accompanying sound carrier relative to the picture carrier. For example, in monochrome receivers incorporating the so-called intercarrier sound system, optimum operating conditions generally require a ratio between picture carrier and sound carrier amplitudes at the output of the IF amplifier of the order of 15 to 1. Additional traps in the receiver's video circuits may be provided and tuned to the intercarrier beat to provide the further attenuation of sound components in the video channel necessary to eliminate sound interference with picture. In color receivers, however, the proper handling of sound components in IF and video circuits poses a more complicated problem. A color television composite picture signal in accordance with present FCC standards includes a color subcarrier of approximately 3.58 mc. Chrominance information is conveyed by sidebands of the color subcarrier, one sideband necessarily extending close to the accompanying sound components in the frequency spectrum of a color television signal. If attenuation of sound carrier relative to picture carrier in the color receiver's IF amplifier is only of the aforesaid order of 15 to 1, an objectionable beat of approximately 920 kc. (the difference between the 3.58 color subcarrier and the 4.5 intercarrier beat) appears with significant amplitude in the video output of the second detector. An interfering signal of this frequency cannot be conveniently trapped out in the subsequent video circuits. To eliminate this beat between color subcarrier and sound in the video channel, it is imperative that the sound carrier be greatly attenuated before its application to the video second detector, a non-linear circuit element wherein such a beat will otherwise be produced.

It is thus apparent that it is necessary to provide a color receiver IF amplifier with rejection networks or traps which strongly attenuate the sound carrier. From the point of view of avoidance of color crosstalk, it is desirable that the spacing between the edge of the passband and the peak rejection frequency be as narrow as possible so as to avoid unnecessary attenuation of the upper sidebands of the color subcarrier. However, with trap circuits of the character heretofore employed, the achievement of such a narrow spacing, i.e. the provision of a steep skirt for the response characteristic of the IF amplifier, is accompanied by highly undesirable phase distortion of signal components in the vicinity of the sloping skirt of the response characteristic. A dilemma is thus posed, a steep-skirted response characteristic introducing non-linear phase characteristics which result in erroneous color information, and a shallow-skirted response characteristic introducing color distortion due to unequal amplitudes of response to corresponding upper and lower sidebands of the color subcarrier.

As a solution to the problem discussed above, there have been proposed for such color television receiver IF channel uses bandpass circuits provided with novel traps operating on a cancellation principle as opposed to the absorption principle of the conventionally employed trap circuit, whereby a response characteristic with the steep slope desired, as above indicated, for sound rejection in color IF amplifiers may be provided without introducing the objectionably non-linear phase characteristics normally accompanying such sharp rejection by conventional trap circuits.

In a suggested interstage coupling network utilizing such novel trap principles, a pair of mutually coupled substantially similar windings, which may, for example, be the respective windings of a bifilar coil, are connected in series between the output terminal of a stage and the input terminal of the succeeding stage of a bandpass amplifier. The windings are related such that signals conveyed via transformer action of the mutually coupled windings undergo a phase reversal. The point of serial connection between the windings is connected to a point of reference potential via a parallel resonant circuit, the connection between the windings and said parallel resonant circuit being at a point on the inductance element of the latter. This parallel resonant circuit is sharply tuned to a frequency lying near the desired rejection band. The mutually coupled windings resonate at a frequency in the desired passband, being broadly tuned thereto.

The cancellation principle of operation may be described briefly as follows: The impedance characteristics of the sharply tuned parallel resonant circuit and the broadly tuned windings may be chosen so that at a desired peak rejection frequency, $f_1$, the input voltage will divide substantially equally between the input winding and the sharply tuned trap circuit. The respective divided voltages will correspond in phase as well as amplitude. Due to the aforementioned phase reversal in the transformer action of the mutually coupled windings, however, the voltage across the output winding will be equal to but opposite in phase to the input voltage component appearing across the input winding of the mutually coupled pair. Thus, the net output voltage at the output terminal is essentially zero since the output voltage component across the output winding will be effectively cancelled out by the equal but oppositely phased output voltage component appearing across the trap circuit. Attenuation ratios of 100 to 1 may be readily achieved with an $f_1$—$f_2$ spacing (i.e. a spacing between the rejection center frequency and the nearest frequency of essentially full amplitude response) of the order of only 300 kc. at a center frequency of 40 mc.

The present invention is concerned with novel bandpass network-trap combinations utilizing the above-described trap principles, in which improvements in desirable rejection characteristics, such as high rejection, low after-response, and relatively little reaction on the passband are attained. In a particular embodiment of the present invention, additional capacitance is introduced in series with the input winding of an interstage coupling network of the general type described above. The introduced capacitance is chosen to be substantially equal to the capacitance effectively in series with the output winding of the interstage coupling network as utilized. The particular result desired is to effect a balance of the reactances in the input and output "meshes" of the coupling network, so that the point of serial connection between the windings, to which the sharply tuned trap circuit is connected, is effectively an RF null point in the bandpass network. It has been observed that when such capacitor balancing is carried out the desirable improvements in rejection characteristics noted above are achieved. The presence of the sharply tuned trap circuit in the bandpass network has substantially no effect upon the frequency response characteristic of the coupling network in the passband. Similarly, after-response is held to a minimum, i.e. the naturally low response of the bandpass network to frequencies outside the passband and beyond the rejection band is not altered by the presence of the sharply tuned trap circuit. Adjustments of the circuit constants to effect maximum rejection at a desired frequency are readily achieved. Also, use of staggered-tuned and doubly-tuned bandpass networks in the interstage coupling is rendered more practically attainable where practice of the capacitive balancing principles of the present invention is followed.

Accordingly, it is a primary object of the present invention to provide novel and improved signal transfer apparatus of a modified bandpass character.

A further object of the present invention is to provide novel and improved bandpass network-trap combinations.

It is an additional object of the present invention to provide novel and improved interstage coupling networks of a bandpass character modified to provide sharp rejection at an edge or edges of the passband.

It is another object of the present invention to provide novel and improved intermediate frequency amplifiers utilizing interstage couplings comprising the combinations of bandpass networks and trap circuits.

It is also an object of the present invention to provide a novel and improved color television receiver IF amplifier.

It is also an object of the present invention to provide novel and improved apparatus for sound rejection in intermediate frequency amplifiers of monochrome and color television receivers.

Other objects and advantages of the present invention will be more readily apparent to those skilled in the art after a reading of the following detailed description and an inspection of the accompanying drawings in which.

Figures 1, 2:
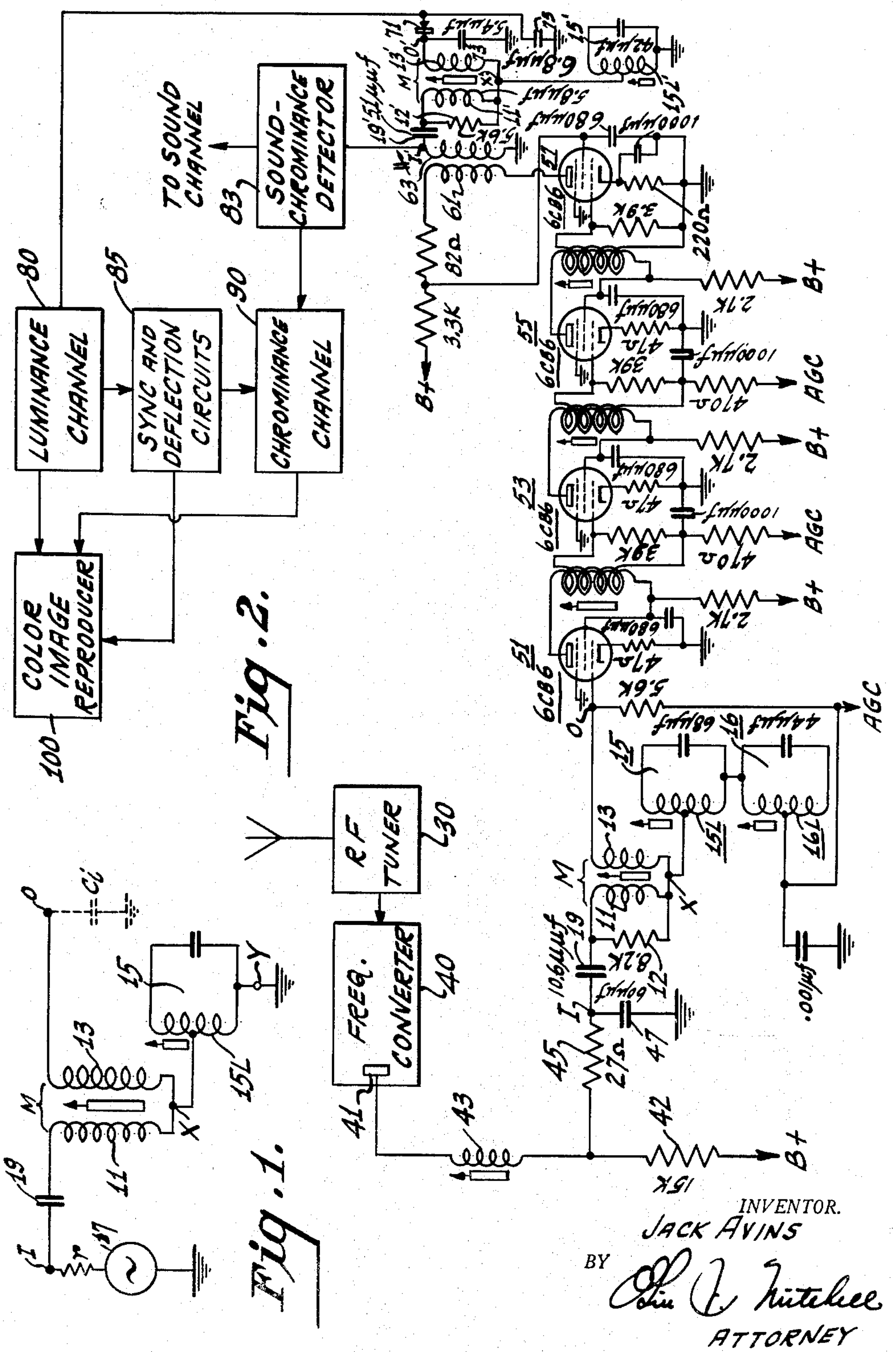
FIGURE 1 illustrates schematically an improvement in an interstage coupling network in accordance with the general principles of the present invention.
FIGURE 2 illustrates a color television receiver incorporating an IF amplifier (illustrated schematically) employing coupling networks in accordance with several embodiments of the present invention.

Referring more specifically to FIGURE 1, there is illustrated schematically an interstage coupling network having an input terminal "I," an output terminal "O" and a common terminal "Y," latter being illustrated as at ground potential. A signal source, indicated schematically by generator 17 with effective series resistance "$r$," applies a signal current to the input terminal "I." It is assumed in the drawing that the output terminal "O" is coupled to some form of signal utilization apparatus which presents an effective input capacity $C_i$ to the network, this capacity being indicated on the drawing by the dotted line condenser representation connected between the output terminal "O" and ground.

The coupling network includes a pair of mutually coupled inductances 11 and 13, which may for example comprise the respective windings of a bifilar coil. The windings 11 and 13 are connected together at junction point "X." The other end of the output winding 13 is directly connected to the output terminal "O," while the other end of the input winding 11 is connected via a capacitor 19 to the input terminal "I."

The input and output windings 11 and 13 are broadly tuned with the capacitances in series therewith, i.e. capacitor 19 and the input capacitance $C_i$, to a frequency in a desired passband, the effective series resistance "$r$" determining the Q of the series resonant circuit. A sharply tuned parallel resonant circuit 15 is connected between the junction point "X" and the common ground terminal "Y," e.g. one end of the tank circuit 15 being grounded, and a tapping point on the inductance element 15L being connected to the junction point "X."

The described network effects sharp rejection of a predetermined frequency at the edge of the passband in the manner previously described. That is, throughout most of the passband the impedance of the tank circuit 15 is so insignificant that junction point "X" is effectively grounded, and transfer of signals from the generator 17 to the signal utilization device is effected via the coupled windings in accordance with the bandpass characteristic of the broadly-tuned windings. However, at a predetermined peak rejection frequency at the edge of the passband, a condition is reached where the output component developed across tank circuit 15 (i.e. between "X" and "Y") is substantially equal in amplitude but opposite in phase to the output component appearing across output winding 13. Thus, at this frequency, substantially complete signal cancellation takes place. For frequencies beyond the rejection frequency, the impedance of tank circuit 15 dwindles again to an insignificant level, and junction point "X" is again effectively grounded.

It will be appreciated from the above description that, apart from a narrow band of frequencies about the peak rejection frequency, it would be desirable to eliminate or minimize the effect of the tank circuit 15 upon the response characteristic of the coupling network, since, apart from this narrow band of frequencies, it is desired that the coupling network obey the bandpass characteristic of the broadly-tuned windings. In accordance with the principles of the present invention, this minimization or elimination of the effects of the tank circuit 15 in the passband, and in the after-response region beyond the rejection frequency, is insured by effectively making the junction point "X" an RF null point in the bandpass network. Thus, a capacitor 19 is included in series with the input winding 11 in the illustrative embodiment of FIGURE 1, the capacitance of capacitor 19 being chosen to substantially equal the capacitance in series with the output winding 13, i.e. the input capacity $C_i$. It will be appreciated by those skilled in the art that if the capacitor 19 so matches the input capacity $C_i$ in the illustrated network, the junction point "X" is effectively an RF null point in the bandpass network for signal frequencies in the aforementioned passband, and tank circuit 15 being coupled between this null point and ground will have substantially no reaction on the network in the passband. After a consideration of the intermediate frequency amplifier illustrated schematically in FIGURE 2, in which coupling networks embodying the principles of the present invention are particularly shown, equivalent circuits for the basic network of FIGURE 1 will be discussed to further aid an understanding of the principles of the present invention.

A color television receiver is illustrated in FIGURE 2 as including a conventional head-end section, which may include a conventional RF tuner 30 and frequency converting apparatus 40. While details of the frequency converter 40 have not been illustrated, an output electrode 41 has been indicated schematically. The output electrode 41 may, for example, comprise the anode of an electron tube, which is utilized to effect the conversion of the received color picture signals to intermediate frequencies. The converter output circuit coupled to electrode 41 includes an inductance 43, in series with a resistor 45 and a capacitor 47. The capacitor 47 serves as a capacitive coupling path between the converter output circuit and a coupling network of the general type discussed above in connection with FIGURE 1. That is, the capacitor 47 is shared by the converter output circuit and the input mesh of a novel bandpass network-trap combination embodying the principles of the present invention.

The bandpass network again includes inductively coupled input and output windings 11 and 13, which may as pointed out above comprise the respective windings of a bifilar coil. The junction point "X" between the input winding 11 and the output winding 13 is again connected to a suitable tapping point on the inductance element 15L of a sharply tuned parallel resonant circuit 15. The output terminal "O" of the novel coupling network is connected to the input electrode of a first IF amplifying stage 51. Connected in cascade therewith are second, third and fourth amplifying stages 53, 55 and 57. The output circuit of the fourth IF amplifying stage 57 includes an inductance 61. Inductively coupled to the output coil 61 is a secondary winding 63. One end of the winding 63 is grounded, while the other end is connected to the input terminal I′ of a second coupling network embodying the principles of the present invention. The output terminal O′ of this coupling network is connected to the input electrode of a video detector 71. The output electrode of detector 71 is coupled to the input of the receiver's luminance channel 80. The input terminal I′ serves also as the take-off point to an additional second detector 83, the output of which supplies signals to the receiver's sound channel as well as to the receiver's chrominance channel 90.

The ouputs of the luminance and chrominance channels 80 and 90 are applied to a color image reproducer 100 for suitable combination to effect the desired color reproduction of the televised scene. The usual sync and deflection circuits 85 derive synchronizing information from the signals appearing in the luminance channel 80, supplying the requisite scanning waves to the image reproducer 100, and control utilization of color synchronization information in the chrominance channel 90. Details of the luminance channel circuitry, chrominance channel circuitry, color image reproducer, etc. have not been specifically shown in the drawing for purposes of simplification, since it is believed that such details are not necessary for an understanding of the present invention. Reference, however, may be made to various publications, such as the June 1953 issue of the RCA Review, for an understanding of the principles of a compatible color television system which accords with the present FCC color broadcast standards, and for representative apparatus suitable for use in the receivers of such systems.

For the purposes of understanding typical applications of the principles of the present invention, however, attention should be particularly directed to the schematically illustrated couplings between the converter 40 and the first IF amplifier 51, and between the fourth IF amplifier 57 and the video detector 71. The coupling between converter 40 and the first IF amplifier 51 illustrates application of an embodiment of the present invention to a stagger-tuned coupling network, in which "low side" capacitive coupling is employed between two stagger-tuned resonant circuits. Capacitor 47 provides the "low side" capacitive coupling between the resonant circuit comprising windings 11 and 13 and their associated capacities, and a second resonant circuit which comprises the inductance 43 and its associated capacitance. On the other hand, the coupling between the fourth IF amplifier 57 and detector 71 illustrates the use of "low side" inductive coupling between a resonant circuit comprising the windings 11′ and 13′ and their associated capacitance and a second resonant circuit comprising the output coil 61 and its associated capacitance. As in the first-mentioned coupling, the two resonant circuits may be stagger-tuned to provide a desired bandpass characteristic.

It will be noted that in the specific applications of the network of FIGURE 1 to the IF channel of FIGURE 2, certain modifications of the basic circuit have been made. In particular, it may be noted that the input winding 11 and the input winding 11′ in FIGURE 2 are each shunted by a bridging resistor, 12 and 12′, respectively. The presence of such a bridging resistor insures more complete cancellation at the peak rejection frequency. Circuit analysis of the network of FIGURE 1, which shall be set forth subsequently, has indicated the desirability of including such a bridging resistor to minimize response at the rejection frequency (the bridging resistor effectively canceling out the response due to the resistance presented by the finite-Q parallel resonant trap).

The coupling network between converter 40 and the first IF amplifier 51 also illustrates a modification of the network of FIGURE 1 that may be readily effected as desired, namely, the inclusion of a second sharply tuned parallel resonant circuit 16 in the coupling between junction point "X" and a point of signal reference potential. The presence of the additional parallel resonant circuit 16 permits use of the described network in cancellation trapping of a second undesired interfering frequency, for example at the opposite end of the passband from that at which parallel resonant circuit 15 provides cancellation. Thus, for example, resonant circuit 15 may be tuned to provide cancellation of the accompanying sound carrier at the 41.25 mc. end of the usual IF passband, while resonant circuit 16 may be tuned to provide cancellation of the adjacent channel sound carrier at the 47.25 mc. end.

It may also be noted that point "X" is not returned to a point of ground potential via the tank circuits 15 and 16, but rather to a point of AGC potential. It will be appreciated that this is necessary in order to permit effective AGC control of the first IF amplifier. However, since the AGC potential is effectively a reference potential for the IF signals, the operating principles of the network do not thereby differ from those discussed with respect to the embodiment of FIGURE 1.

It will be observed that in accordance with the principles of the present invention discussed previously, capacitors 19 and 19′ are respectively included in series with the input winding 12 and the input winding 12′ of the coupling networks of FIGURE 2 under consideration. The capacitance value of capacitor 19 is chosen to match the reactance in the input winding 11 "mesh" with the reactance in the output winding 13 "mesh." The capacitance value of capacitor 19 will be chosen to substantially match the input capacitance of the first IF amplifier 51. However, the capacitance of the coupling capacitor 47 should be taken into account in calculating the exact value desired for capacitor 19, thus causing this value to differ slightly from the input capacitance of IF amplifier 51. Similarly the capacitor 19′ will be chosen to essentially match the capacitance presented by the detector 71 and its associated capacitors 73 and 75, although the reactance of coil 63 must in this case be taken into account in determining the exact value for capacitor 19′. As will be appreciated from the discussion with respect to FIGURE 1, the proper choice of capacitors 19 and 19′ in the coupling networks of FIGURE 2 will result in making junction points "X" and X′ effectively RF null points in the bandpass networks, and in achievement of such desirable rejection characteristics as minimum reaction of the trap on the passband, low after-response, etc.

Figure 3:
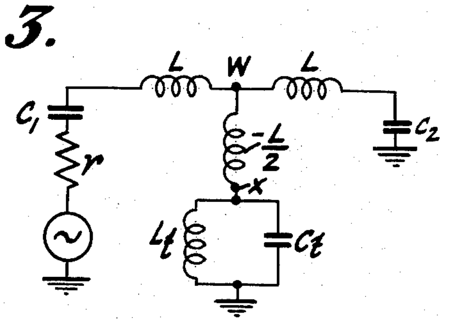
FIGURE 3 illustrates schematically an equivalent circuit representation of the network of FIGURE 1.

In order that a more complete understanding of the principles of the present invention may be obtained, the basic network of FIGURE 1 has been redrawn in FIGURE 3, with the transformer 11—13 replaced by an equivalent circuit representation. As illustrated, the equivalent circuit for replacement for the coupled windings 11 and 13 comprises a pair of non-coupled inductances (each of a value L, equal to twice the inductance of one winding) in series with the signal source and the capacitances $C_1$ and $C_2$ (representing capacitor 19 and the input capacitance $C_i$ of FIGURE 1), and a negative inductance, of a value $-L/2$ connected between the junction point (W) of the series inductances and the point "X" to which the parallel resonant circuit $L_tC_t$ (representative of the trap circuit 15) is coupled. The cancellation trapping principles of the network of FIGURE 1 may be simply explained with respect to the equivalent circuit representation of FIGURE 3 as follows: At some predetermined off-resonance frequency, the reactance represented by the parallel resonant circuit $L_tC_t$ will be inductive and equal in magnitude to the negative inductance, $-L/2$. Thus, at this frequency, there will be zero reactance presented between point W and ground, i.e. the energy supplied by the signal source will be shorted to ground at point W, and no output will appear across $C_2$.

At other frequencies, in the passband of the series resonant circuit formed by $C_1$, L, L, $C_2$, however, this exact reactance cancellation is the W-to-ground leg will not occur, and the leg will present significant impedance. However, by virtue of the balancing principles of the present invention, whereby $C_1$ is chosen to substantially equal $C_2$, point W is essentially a null point in the $C_1$, L, L, $C_2$ series resonant circuit. The voltage developed at point W is thus zero except for the small quadrature voltage appearing at this point due to the presence of the resistance "$r$" in the input mesh. Since the cancellation leg "hangs" off the effective null point W, it will be seen that its presence has very little effect on the overall series resonant circuit response (except at the rejection frequency and in the immediate vicinity thereof).

Figure 4:
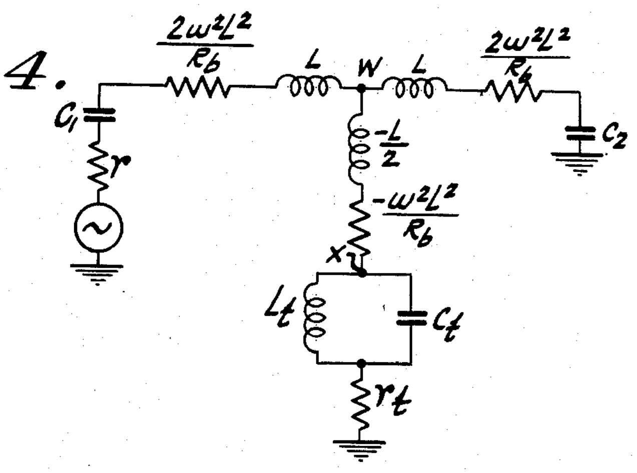
FIGURE 4 illustrates schematically an equivalent circuit representation of a modified form of the network of FIGURE 1.

It will be appreciated that the above explanation of the presentation of zero impedance by the W-to-ground leg at the peak rejection frequency is not completely accurate if it is recognized that the parallel resonant circuit $L_tC_t$ has a finite Q. If $L_tC_t$ has some value of Q other than infinity, some resistance will be exhibited by the W-to-ground leg at the peak rejection frequency. As noted in the discussion of FIGURE 2, the response exhibited at the rejection frequency due to the resistance presented by the trap circuit may be effectively nullified by connecting a bridging resistor (e.g. resistors 12 and 12' in FIGURE 2) in shunt with one of the coupled windings. FIGURE 4 provides an equivalent circuit representation of the network of FIGURE 1 as modified by the shunting of a bridging resistor $R_b$ across the input winding 11. As shown in FIGURE 4, the use of such a bridging resistor is equivalent to the presence of series resistors, each of a value equal to $$\frac{2\omega^2L^2}{R_b}$$

in the input and output meshes, and the presence of a negative resistance, of a value equal to $$\frac{-\omega^2L^2}{R_b}$$

in the W-to-ground leg. If the bridging resistor $R_b$ is chosen so that this negative resistance is equal in amplitude, at the rejection frequency, to the equivalent series resistance $r_t$ of the finite-Q trap circuit $L_tC_t$, complete cancellation of the rejection frequency may be substantially achieved.

Figure 5:
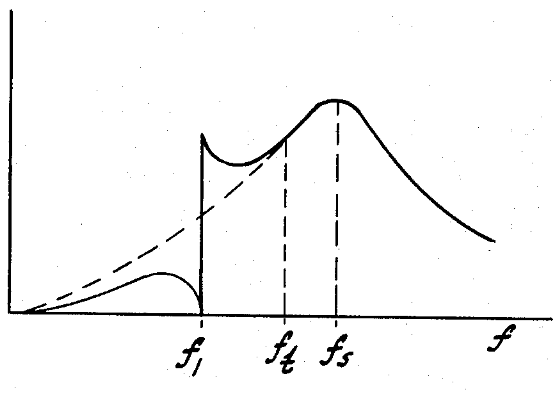
FIGURE 5 illustrates graphically frequency response characteristics of aid in explaining the operation of the disclosed networks.

In FIGURE 5 a typical frequency response characteristic for the networks of which FIGURES 3 and 4 are equivalents is illustrated by the continuous line curve. The frequencies designated by $f_1$, $f_t$ and $f_s$ along the frequency axis of FIGURE 5 represent, respectively, the peak rejection frequency (at which the W-to-ground leg in FIGURES 3 and 4 exhibits zero impedance); the resonant frequency of the trap circuit $L_tC_t$; and the resonant frequency of the series resonant circuit, with the connection to the trap circuit opened. The dotted line curve in FIGURE 5 illustrates the response of the series resonant circuit, with the trap circuit so removed.

Having thus described the invention, what is claimed is:

1. In a television receiver, apparatus comprising the combination of a bandpass network including a pair of mutually coupled inductances, said inductances being directly connected to each other at a common junction point, an RF signal source, an output circuit, means for connecting said pair of inductances in series with said signal source and said output circuit, means including a capacitor inserted in series between said signal source and said pair of inductances for causing said junction point to effectively comprise an RF null point in said bandpass network, a relatively sharply tuned parallel resonant circuit, and means for coupling said parallel resonant circuit between said junction point and a point of reference potential.

2. In a television receiver IF amplifier, an interstage coupling network comprising in combination a bandpass network including a pair of coupled resonant circuits, one of said resonant circuits comprising a series resonant circuit including a pair of mutually coupled inductances, said inductances being directly connected to each other at a common junction point, an IF signal source coupled to the other of said resonant circuits, an IF signal utilization device coupled to said series resonant circuit, a capacitor inserted in series with one of said pair of inductances, the capacitance value of said capacitor substantially corresponding in magnitude to the capacitance presented by said signal utilization device to said bandpass network, and sound rejection means comprising a relatively sharply tuned parallel resonant circuit coupled between said junction point and a point of reference potential.

3. In a color television receiver, means for transferring composite color picture signals at intermediate frequencies from a signal source to a signal utilization device comprising the combination of a bandpass network including a first resonant circuit coupled to said signal source, a second resonant circuit including a pair of mutually coupled inductances coupled to said signal utilization device, means for coupling said pair of resonant circuits together, said pair of mutually coupled inductances having a common junction point of connection, capacitive means in series with one of said pair of inductances for causing said junction point to effectively comprise an IF null point in said bandpass network, and sound IF rejection means including a relatively sharply tuned parallel resonant circuit coupled between said junction point and a point of reference potential, wherein said pair of mutually coupled inductances comprise the respective windings of a bifilar coil, and wherein said capacitive means includes a capacitor connected in said second resonant circuit at an IF signal path point preceding said junction point and of a capacitance value substantially corresponding in magnitude to the capacitance presented by said signal utilization device to said second resonant circuit.

4. In a television receiver, a coupling network for transferring composite color picture signals at intermediate frequencies from an IF signal source to an IF signal utilization device while rejecting accompanying sound signals, said signal transfer means comprising the combination of a bandpass network including a pair of mutually coupled windings, said pair of mutually coupled windings having a common junction point, one of said windings comprising an input winding coupled to said signal source, the other of said windings comprising an output winding coupled to said signal utilization device, capacitive means in series with said input winding for causing said junction point to comprise an effective null point in said bandpass network, and sound signal rejection means including a tank circuit coupled between said junction point and a point of reference potential wherein said pair of mutually coupled windings comprise the respective winding of a bifilar coil, wherein said tank circuit includes an inductive element having an intermediate tapping point, said junction point being connected to said tapping point, and wherein said capacitive means in series with said input winding substantially balances the capacity of said signal utilization device effectively in series with said output winding.

5. Apparatus in accordance with claim 4 wherein the coupling between said input winding and said signal source includes a parallel resonant circuit tuned to a frequency within the passband of said bandpass network, and wherein said pair of mutually coupled windings are resonant with the capacities in series therewith also at a frequency in said passband.

6. In a color television receiver, means for passing a predetermined band of color television signal intermediate frequencies while rejecting accompanying sound signal intermediate frequencies, said means being coupled between an intermediate frequency signal source and an intermediate frequency signal utilization device and comprising in combination, a bandpass network including a pair of reactively coupled resonant circuits, one of said resonant circuits being coupled to said signal source, the other of said resonant circuits including a pair of mutually coupled windings having a common junction point of electrical connection, one of said pair of windings comprising an input winding coupled to said one resonant circuit, the other of said windings comprising an output winding coupled to said signal utilization device, means for effectively balancing the reactance in series with said input winding with the reactance in series with said output winding, and sound signal rejection means including a trap circuit coupled between said junction point and a point of IF signal reference potential.

7. Apparatus in accordance with claim 6 wherein said pair of resonant circuits are stagger-tuned to frequencies in said band of color television signal intermediate frequencies, and wherein said trap circuit is relatively sharply tuned to provide cancellation of said accompanying sound signal intermediate frequencies.

8. Apparatus in accordance with claim 7 wherein said color television receiver includes an IF amplifier and a second detector, wherein said signal source comprises said IF amplifier, said signal utilization device comprises said second detector, and wherein inductive coupling is utilized between said pair of resonant circuits.

9. Apparatus in accordance with claim 7 wherein said color television receiver includes radio frequency converting apparatus and a first IF amplifier, wherein said IF signal source comprises said frequency converting apparatus, said IF signal utilization device comprises said first IF amplifier, and wherein common capacitive coupling is utilized between said pair of resonant circuits.

10. Apparatus in accordance with claim 9 wherein said sound signal rejection means also includes a second trap circuit cascaded with said first-named trap circuit in the coupling between said junction point and said point of IF signal reference potential, said second trap circuit being relatively sharply tuned to provided cancellation of adjacent channel sound signal intermediate frequencies.

11. In a television receiver including a source of picture intermediate frequency signals occupying a predetermined intermediate frequency band and a modulated sound carrier at an intermediate frequency outside said predetermined band, said receiver also including an intermediate frequency signal utilization device having an input terminal, a coupling network comprising in combination a pair of mutually coupled inductances, said inductances being directly connected to each other at a common junction point, means for connecting a point on one of said inductances remote from said common junction point to said signal utilization device input terminal, a capacitance of a predetermined magnitude being presented between said signal utilization device input terminal and a point of reference potential, means including a capacitor inserted in series between said signal source and said pair of inductances for causing said junction point to effectively comprise a null point in a resonant network formed by said capacitor, said pair of inductances, and said capacitance, a parallel resonant circuit including an inductance element, and means including at least a portion of said inductance element for connecting said junction point to said point of reference potential, said parallel resonant circuit being tuned to a frequency related to said sound carrier intermediate frequency such that substantial cancellation of said modulated sound carrier is effected at said signal utilization device input terminal.

12. Apparatus in accordance with claim 11 wherein said pair of inductances comprise a pair of substantially similar, bifilar wound windings, and wherein the capacitance value of said capacitor is chosen to be substantially equal to said predetermined magnitude of capacitance.

References Cited in the file of this patent

UNITED STATES PATENTS

| | | |
|---|---|---|
| 1,624,665 | Johnson et al. | Apr. 12, 1927 |
| 1,725,433 | Vreeland | Aug. 20, 1929 |
| 2,085,952 | Cauer et al. | July 6, 1937 |
| 2,246,935 | Feldtkeller | June 24, 1941 |
| 2,619,536 | Cotsworth et al. | Nov. 25, 1952 |
| 2,697,744 | Richman | Dec. 21, 1954 |
| 2,707,730 | Torre | May 3, 1955 |

FOREIGN PATENTS

| | | |
|---|---|---|
| 710,535 | France | June 8, 1931 |

OTHER REFERENCES

RCA, Color Television Receiver, Model CT-100, March 1954, pages 31 and 32.